(12) United States Patent
Servaas (10) Patent No.: US 9,433,225 B2
(45) Date of Patent: Sep. 6, 2016

(54) BRUSH ELEMENT, ASSEMBLY, BRUSHING DEVICE AND METHODS OF COUPLING AND UNCOUPLING

(75) Inventor: Hans Servaas, Neede (NL)

(73) Assignee: HUMBOLDT B.V., Lichtenvoorde (NL)

( * ) Notice: Subject to any disclaimer, the term of this patent is extended or adjusted under 35 U.S.C. 154(b) by 779 days.

(21) Appl. No.: 12/094,984

(22) PCT Filed: Aug. 8, 2006

(86) PCT No.: PCT/NL2006/050195
§ 371 (c)(1),
(2), (4) Date: Sep. 30, 2008

(87) PCT Pub. No.: WO2007/100240
PCT Pub. Date: Sep. 7, 2007

(65) Prior Publication Data
US 2009/0156110 A1 Jun. 18, 2009

(30) Foreign Application Priority Data
Nov. 28, 2005 (NL) ..................................... 1030536

(51) Int. Cl.
*A22B 5/08* (2006.01)
*A22C 21/02* (2006.01)
(52) U.S. Cl.
CPC ............... *A22C 21/022* (2013.01); *A22B 5/08* (2013.01); *A22C 21/02* (2013.01); *Y10T 29/49815* (2015.01); *Y10T 29/49826* (2015.01)
(58) Field of Classification Search
USPC ................. 452/71, 82–97, 123, 173
See application file for complete search history.

(56) References Cited

U.S. PATENT DOCUMENTS

| | | | | |
|---|---|---|---|---|
| 2,412,108 A * | 12/1946 | Toti et al. | ....................... | 452/93 |
| 2,524,942 A * | 10/1950 | Tomlinson | ....................... | 452/93 |
| 2,554,671 A * | 5/1951 | Hodges | ....................... | 452/93 |
| 2,559,001 A * | 7/1951 | Barker | ....................... | 452/93 |
| 2,562,681 A * | 7/1951 | Pine | ....................... | 452/93 |
| 2,641,796 A * | 6/1953 | Johnson | ....................... | 452/92 |
| 2,694,829 A * | 11/1954 | Johnson | ....................... | 452/93 |
| 3,523,324 A | 8/1970 | Debaere | | |
| 3,840,938 A * | 10/1974 | Carlson | ....................... | 452/93 |
| 5,445,163 A * | 8/1995 | Machacek | ............ | A61B 5/0057 600/557 |
| 7,070,494 B2 * | 7/2006 | Rapp et al. | ....................... | 452/88 |
| 7,387,565 B1 * | 6/2008 | Griffiths et al. | ............... | 452/87 |
| 7,604,532 B2 * | 10/2009 | Meier et al. | ................... | 452/93 |

FOREIGN PATENT DOCUMENTS

NL 9002571 6/1992

OTHER PUBLICATIONS

Search Report for International Patent Application No. PCT/NL2006/050195; Jan. 22, 2007.

* cited by examiner

*Primary Examiner* — David Parsley
(74) *Attorney, Agent, or Firm* — Jason A. Bernstein; Barnes & Thornburg LLP (57) ABSTRACT

A brush element (1) for processing carcasses of slaughtered animals. The disclosure also relates to an assembly of a rotatable body and such a brush element. The disclosure further relates to a brushing device comprising such an assembly. Also disclosed is a method for coupling a rotatable body and such a brush element mid also a method for uncoupling such a brush element.

22 Claims, 5 Drawing Sheets

BRUSH ELEMENT, ASSEMBLY, BRUSHING DEVICE AND METHODS OF COUPLING AND UNCOUPLING

PRIORITY CLAIM

This application is a U.S. National Phase of International Patent Application No. PCT/NL2006/050195, filed Aug. 8, 2006, and claims priority to Netherlands Patent Application No. 1030536, filed Nov. 28, 2005, the disclosures of which are incorporated herein by reference in their entirety.

FIELD

The present disclosure relates to a brush element for processing carcasses of slaughtered animals. The disclosure also relates to an assembly of a rotatable body and such a brush element. In addition, the present disclosure relates to a brushing device comprising such an assembly. The disclosure further relates to a method for coupling and decoupling a rotatable body and such a brush element.

BACKGROUND

Brush elements for processing carcasses of slaughtered animals are known, for instance, from Netherlands Patent Application No. 9 002 571. Such brush elements are driven by a rotating shaft which is mounted in a brushing device and is used to remove hair from, clean and/or beat carcasses dry. The brush elements wear through use, as a result of which they must be regularly replaced by new brush elements. A disadvantage of the brush elements known in the prior art is that arranging and removing the known brush elements is laborious and can cause considerable loss of time for the brushing device.

SUMMARY

The present disclosure describes several exemplary embodiments of the present invention.

A brush element for processing carcasses of slaughtered animals, comprising: a) at least one coupling member; and b) at least one substantially elongate flexible whip extending from the at least one coupling member, wherein the coupling member comprises at least one receiving space provided with a narrowed entrance, and wherein the narrowed entrance can be enlarged counter to a bias.

An assembly for processing carcasses of slaughtered animals, comprising: a) a rotatable body; b) at least one brush element having at least one coupling member; and c) at least one substantially elongate flexible whip extending from the coupling member wherein the coupling member comprises at least one receiving space provided with a narrowed entrance, and wherein the narrowed entrance can be enlarged counter to a bias; wherein the coupling member is releasably coupled to a counter-coupling member forming part of the rotatable body such that the whip extends substantially radially from a rotation shaft of the rotatable body; and wherein the receiving space of the coupling member engages round the counter-coupling member.

A further aspect of the present disclosure provides a brushing device for processing carcasses of slaughtered animals, comprising a) a frame; b) at least one assembly mounted in the frame, and c) drive means for causing rotation of the rotatable body of the assembly.

A method for coupling a rotatable body and at least one brush element as claimed in any of the claims 1-11 for the purpose of forming an assembly as claimed in any of the claims 12-15, comprising the operating steps of: a) providing a brush element comprising i) at least one coupling member, and ii) at least one substantially elongate flexible whip extending from the at least one coupling member; wherein the coupling member comprises at least one receiving space provided with a narrowed entrance, and wherein the narrowed entrance can be enlarged counter to a bias; b) enlarging under bias the narrowed entrance of the receiving space of the coupling member of the brush element; and c) causing the receiving space of the brush element to engage round around the counter-coupling member of the rotatable body.

A method for uncoupling at least one brush element from an assembly, comprising: a) providing a brush element comprising i) at least one coupling member, and ii) at least one substantially elongate flexible whip extending from the at least one coupling member; wherein the coupling member comprises at least one receiving space provided with a narrowed entrance, and wherein the narrowed entrance can be enlarged counter to a bias; b) enlarging under bias the narrowed entrance of the receiving space of the coupling member of the brush element; and c) releasing the brush element from the counter-coupling member. One aspect of the present disclosure provides a brush element which can be exchanged in a simplified manner in combination with a drive member.

The present disclosure provides in one exemplary embodiment a brush element for processing carcasses of slaughtered animals, comprising at least one coupling member, at least one substantially elongate flexible whip extending from the coupling member, wherein the coupling member comprises at least one receiving space provided with a narrowed entrance, wherein the narrowed entrance can be enlarged counter to a bias. Such a brush element can be readily arranged and removed again from a counter-coupling member adapted for co-action with the coupling member and having a greater size than the narrowed entrance, wherein the brush element is also sufficiently fixed. A brush element according to the present disclosure can, for instance, be snapped easily and quickly around a rod suitable for this purpose. The coupling member can, for instance, be manufactured from plastic, metal or a combination thereof. The whip is preferably provided with a rough and/or profiled surface suitable for removing hair from, cleaning and/or beating dry the skin of a carcass. The cross-section of the receiving space can take different forms, for instance, substantially triangular, square or octagonal. The narrowed entrance is preferably adapted to enable sufficient enlargement thereof under bias in order to allow a counter-coupling member to pass through the entrance during coupling or uncoupling and to fix the counter-coupling member in the receiving space during use, so that the brush element cannot disconnect from the counter-coupling element during use of the whip.

It is advantageous if the receiving space is substantially U-shaped in cross-section. A U-shaped coupling member is simple to couple and uncouple. A U-shape includes cross-sections wherein the outer ends of the "U" lie against each other, such as in a hairpin, but U-shapes wherein the outer ends are situated a distance from each other in a non-loaded situation can also be envisaged. The U-shape can also be curved asymmetrically.

A part of the receiving space connecting to the entrance is preferably at least partially circular in cross-section. A circular receiving space is suitable for enclosing different forms. Only a part of the cross-section will generally form a circular arc. For purposes of the present disclosure, circular means shapes derived from circles, such as an ellipse.

In one exemplary embodiment, a smallest distance of the narrowed entrance amounts to a maximum of 80% of the greatest distance between opposite contact sides of the receiving space. Such a ratio minimizes the chance of the coupled brush element becoming detached from a correctly dimensioned counter-coupling member during use. It is assumed here that for uncoupling the narrowed entrance must be enlarged under bias to 100% of the greatest distance between opposite contact sides of the receiving space. If the greatest distance lies between 50 and 80%, an optimal relation is obtained between certainty of coupling and convenience of arrangement. In the case of a substantially circular receiving space the greatest distance between opposite contact sides of the receiving space is the diameter of the circle.

In another exemplary embodiment, the smallest distance of the narrowed entrance amounts to a maximum of 50% of the greatest distance between opposite contact sides of the receiving space. Such a ratio minimizes the chance of the brush element becoming detached during use.

In yet another exemplary embodiment, the narrowed entrance is closed in non-loaded situation. The chance of the brush element becoming detached during use is thus decreased still further.

It is advantageous if the narrowed entrance is substantially tapering in the direction toward the receiving space. A locating function is thus obtained which facilitates guiding of a counter-coupling member to the receiving space for the purpose of coupling.

The whip preferably has at least one profiled side adapted to process carcasses of slaughtered animals, wherein the entrance opening is directed substantially away from the profiled side. The entrance to the receiving space is thus loaded the least during use, thereby reducing the chance of undesired uncoupling in the case of increased frictional resistance of the whip.

In a further exemplary embodiment, the coupling member is manufactured substantially from a resilient plastic. Such a coupling member is simple to manufacture and can also withstand dynamic mechanical load such as occurs during processing of slaughtered animals. Suitable resilient plastics are, among others, polymers and copolymers based on polyethylene, polypropylene, polystyrene, polybutadiene, polyisobutylene, polysioprene polystyrene-butadiene (ABS rubber). Thermoplastic plastics are generally the most suitable.

The whip and the coupling member are preferably manufactured from a single material part. Such a brush element is simple to manufacture and has great durability.

In yet another exemplary embodiment, the brush element comprises at least two substantially elongate flexible whips extending from the coupling member. With such an exemplary embodiment the whips can be replaced more quickly since multiple whips can be replaced simultaneously by coupling or uncoupling the coupling member. The more whips that are attached to one coupling member, the greater the time that is gained when the whips are exchanged. From the viewpoint of material use, it is, however, most efficient to have two whips per coupling member so that if one whip malfunctions the number of still intact whips replaced together with the malfunctioning whip is minimal.

The present disclosure also provides an assembly of a rotatable body and at least one brush element wherein the coupling member is releasably coupled to a counter-coupling member forming part of the rotatable body such that the whip extends substantially radially from a rotation shaft of the rotatable body, wherein the receiving space of the coupling member engages around the counter-coupling member. Such an assembly has the advantage that the whips can be replaced rapidly and easily by uncoupling the whip by means of the coupling member and subsequently coupling a replacement whip with a coupling member to the same counter-coupling member. The coupling member can be released by uncoupling, for instance, a snap connection. The counter-coupling member is adapted here for co-action with the coupling member. The rotatable body is, for instance, a shaft, a rotating drum or mill. The whip extends substantially radially from a rotation shaft of the rotatable body. The whip does not necessarily have to extend perpendicularly along a radial line, however, but can deviate from this line both in the rotation direction and in the direction parallel to the rotation shaft. The receiving space of the coupling member engages round the counter-coupling member so that the connection formed by the coupling member and the counter-coupling member is reliable.

It is advantageous that the counter-coupling member has a cross-sectional form substantially the same as the receiving space. A uniform load of the connection formed by the coupling member and the counter-coupling member is thus obtained. If the cross-section of the counter-coupling member and/or the coupling member is formed asymmetrically, a desired position of the whip relative to the counter-coupling member can moreover be realized in a simple manner.

The receiving space of the coupling member preferably has a larger diameter than the counter-coupling member such that the receiving space has play at least in one rotation direction of the rotatable body. Wear of the coupling member is minimized under operating conditions due to some play.

It is advantageous if the counter-coupling member is an engaging shaft located substantially parallel to the rotation shaft at a distance from the rotation shaft. Such a counter-coupling member can be realized in simple manner. The cross-section of such an engaging shaft is preferably circular, because such an engaging shaft can easily be kept clean in a hygienic manner. Triangular, square or other sections can, however, also be envisaged.

The present disclosure also comprises a brushing device for processing carcasses of slaughtered animals, comprising a frame, at least one assembly according to the present disclosure mounted in the frame, and drive means for causing rotation of the rotatable body of the assembly. Using such a brushing device, carcasses of slaughtered animals can be processed with whips, particularly for processing the carcass surface. The used whips can be replaced quickly and easily. Such a device according to the present disclosure will generally comprise a plurality of co-acting rotatable bodies provided with whips. Because the coupling can be realized quickly, less time is lost whereby the device can be used more efficiently.

The present disclosure also provides a method for coupling a rotatable body and at least one brush element according to the present disclosure for the purpose of forming an assembly according to the present disclosure, comprising the operating steps of enlarging under bias the narrowed entrance of the receiving space of the coupling member of the brush element, and causing the receiving space of the brush element to engage around the counter-coupling member of the rotatable body. One or more whips can thus be arranged quickly and easily on a rotatable element. This is particularly important when replacing worn whips.

The present disclosure also provides a method for uncoupling at least one brush element according to the present disclosure from an assembly according to the present disclosure, comprising the operating steps of enlarging under bias the narrowed entrance of the receiving space of the coupling member of the brush element, and releasing the brush element from the counter-coupling member. A worn whip can thus be replaced in simple and rapid manner so that a new replacement whip can then be connected to the counter-coupling member.

BRIEF DESCRIPTION OF THE DRAWINGS

Various aspects of the present disclosure are described hereinbelow with reference to the accompanying figures in which like part number represent like parts throughout the several views of which.

DETAILED DESCRIPTION

Figure 1A:
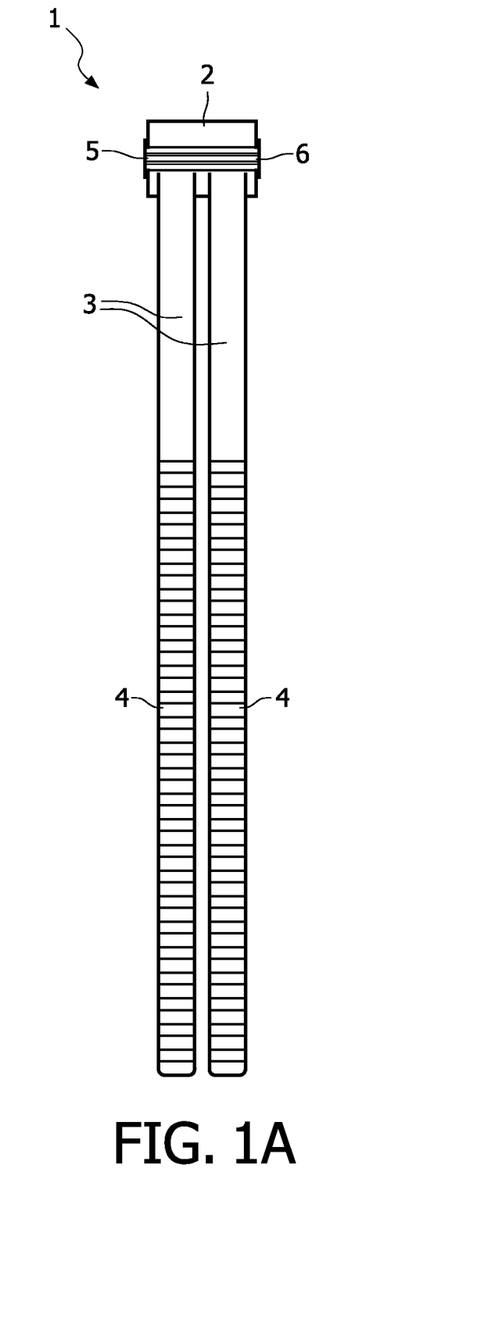
FIG. 1A shows a brush element according to one exemplary embodiment of the present disclosure.

FIG. 1A shows a brush element 1 according to one exemplary embodiment the present disclosure, comprising a coupling member 2 and two whips 3 connected to coupling member 2 and provided with a profiled contact surface for removing hair from carcasses. Brush element 1 is manufactured as one material part assembled from resilient plastic. Coupling member 2 consists of a resilient cylinder, the inner cavity 5 of which forms a receiving space which is accessible via a narrowed entrance channel 6 in lengthwise direction of cylinder 2.

Figure 1B:
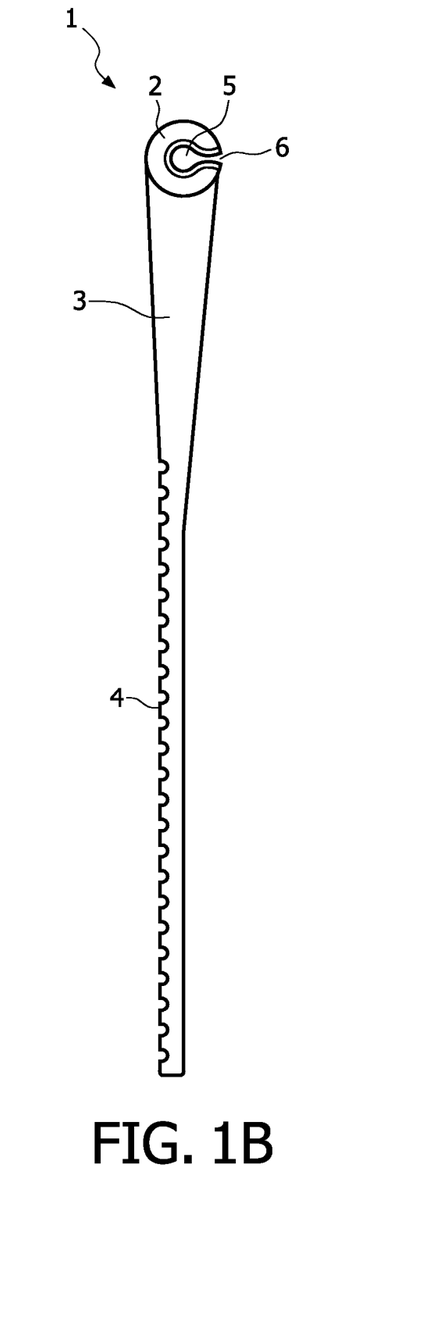
FIG. 1B shows a side view of the brush element of FIG. 1A.
Figure 1C:
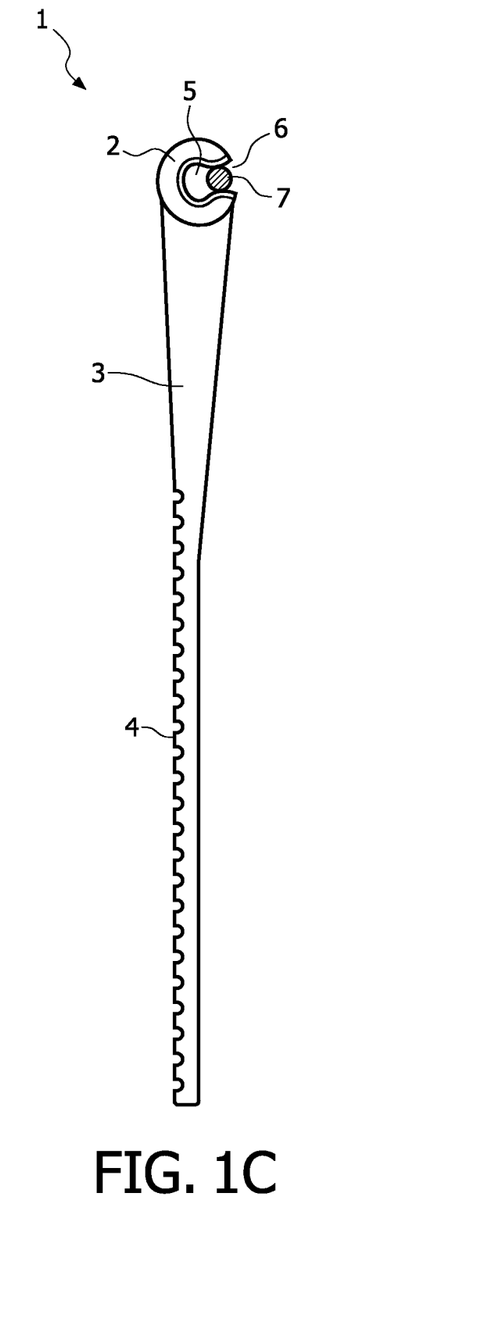
FIG. 1C shows the brush element of FIGS. 1A and 1B during coupling and uncoupling of a coupling member to and from a counter-coupling member.

FIG. 1B shows brush element 1 of FIG. 1A in side view and with corresponding numbering of the elements. It can be seen that the narrowed entrance 6 tapers toward receiving space 5 in the direction of receiving space 5, thereby creating a locating function which makes it easier to guide a counter-coupling member to receiving space 5. Whips 3 have a profiled surface 4 on one side, wherein entrance 6 is oriented away from the profiled surface. During the processing of carcasses or carcass parts the whip will be moved substantially in the direction of profiled surface 4 wherein, due to the orientation of entrance 6, the chance of the whip sliding off a counter-coupling member in undesired manner is minimal FIG. 1C shows brush element 1 of FIGS. 1A and 1B during both coupling and uncoupling of coupling member 2 to and from a counter-coupling member. In order to move counter-coupling member 7 with a circular cross-section in and out of receiving space 5, the narrowed entrance must be temporarily enlarged under bias. After the counter-coupling member 7 has passed through, the entrance springs back to its starting position as shown in FIGS. 1A and 1B. Counter-coupling member 7 can, for instance, be a rod round which the receiving space 5 of the coupling member is dimensioned to engage.

Figure 1D:
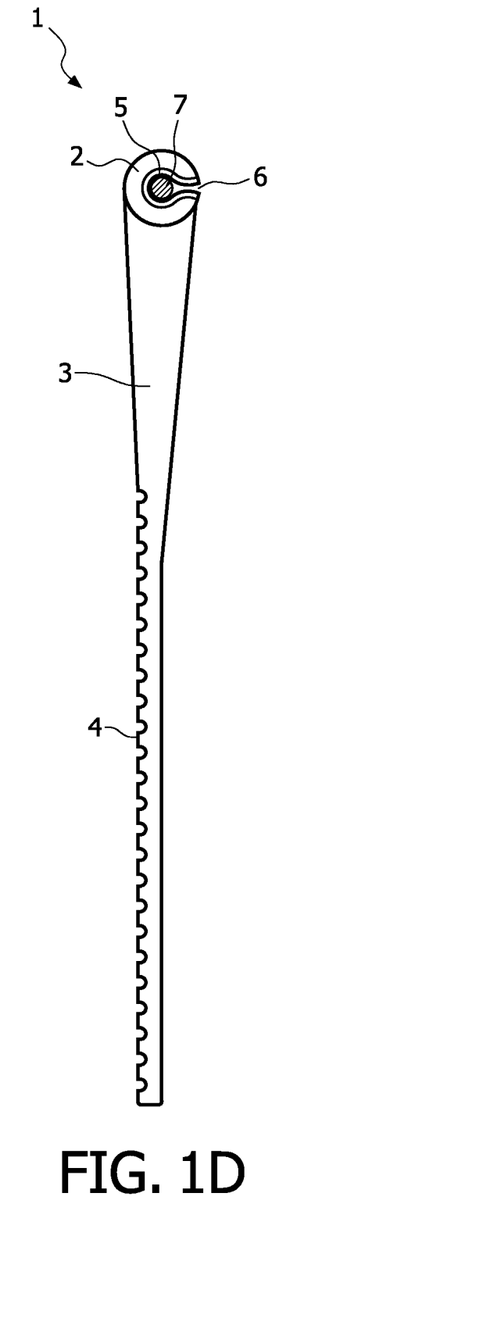
FIG. 1D shows the brush element of FIGS. 1A and 1B wherein a coupling member engages around a counter-coupling member.

FIG. 1D shows brush element 1 wherein coupling member 2 engages round a counter-coupling member 7. This engagement can be under bias (clamping) as well as without bias, wherein some play in the orientation of whip 3 is possible relative to counter-coupling member 7. The occurrence of bias or play can be adjusted as desired by choosing the dimensions of the sectional profile of the coupling member in relation to that of the counter-coupling member.

Figure 1E:
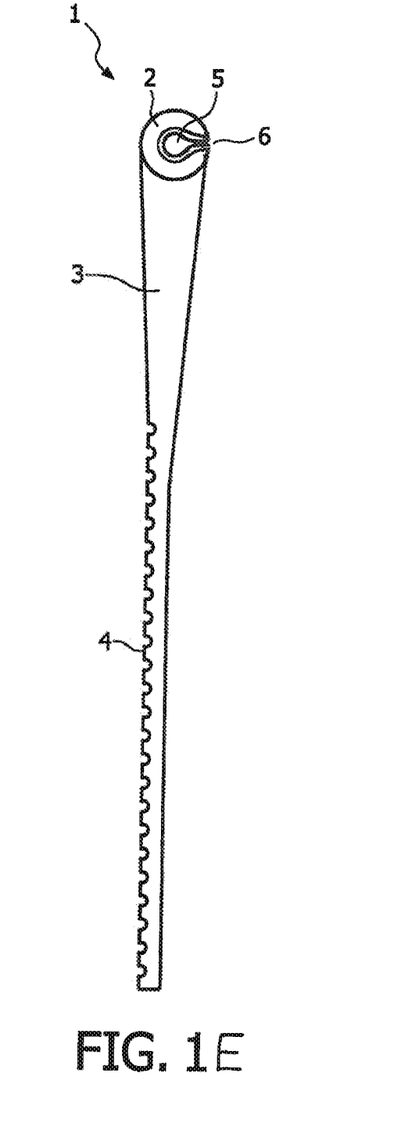

FIG. 1E shows an alternative embodiment showing a closed entrance 6.

Figure 2A:
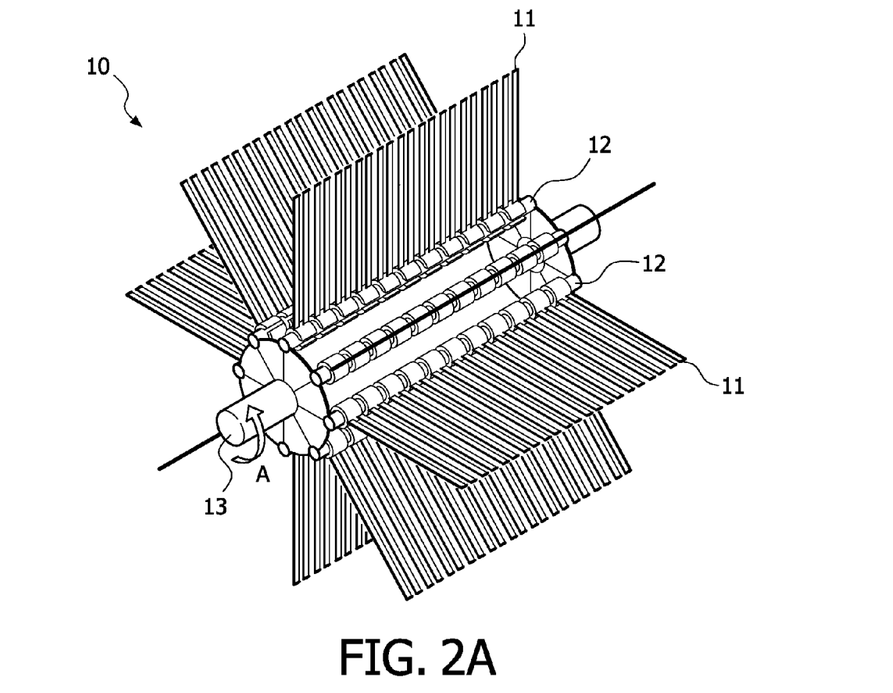
FIG. 2A shows one exemplary embodiment of an assembly of a brush according to FIGS. 1A-1D with a rotatable body.

FIG. 2A shows an exemplary embodiment of an assembly 10 of a plurality of brush elements 11 (comparable to those of FIGS. 1A-1D) and rod-like counter-coupling members 12 which form part of a rotatable body 13 according to the present disclosure. Rotatable body 13 and brush elements 11 together form a rotatable brush which is rotatable about a rotation shaft A. Brush elements 11 are ordered in regular rows so that it is easily possible to determine visually whether a whip of brush element 11 is malfunctioning, for instance, is kinked or has other damage. Counter-coupling members 12 are distributed uniformly over the rotatable body 13. This creates six equivalent groups of brush elements 11, wherein a carcass surface placed close to assembly 10 always makes contact with at least one of the groups of brush elements 11. In order to realize such a continuous processing, distribution of the brush elements in at least four groups spread uniformly over the arc of rotation is essential. Five or more groups do, however, provide the best results.

Figure 2B:
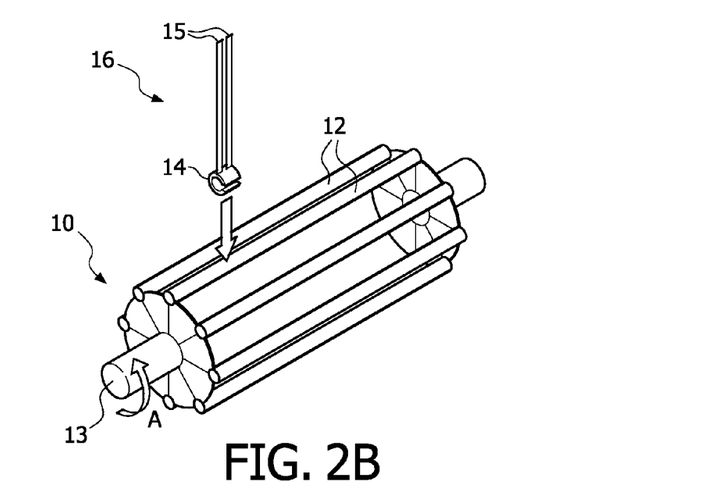
FIG. 2B shows a mounting of a brush element on a rod to form the rotatable bush of FIG. 2A.

FIG. 2B shows how a brush element 16 provided with a coupling member 14 and two whips 15 can be mounted on a rod 12 of a rotatable body 13 so as to form the rotatable brush 10 of FIG. 2A. Brush element 16 is comparable to the brush element of FIGS. 1A-1D.

Figure 3:
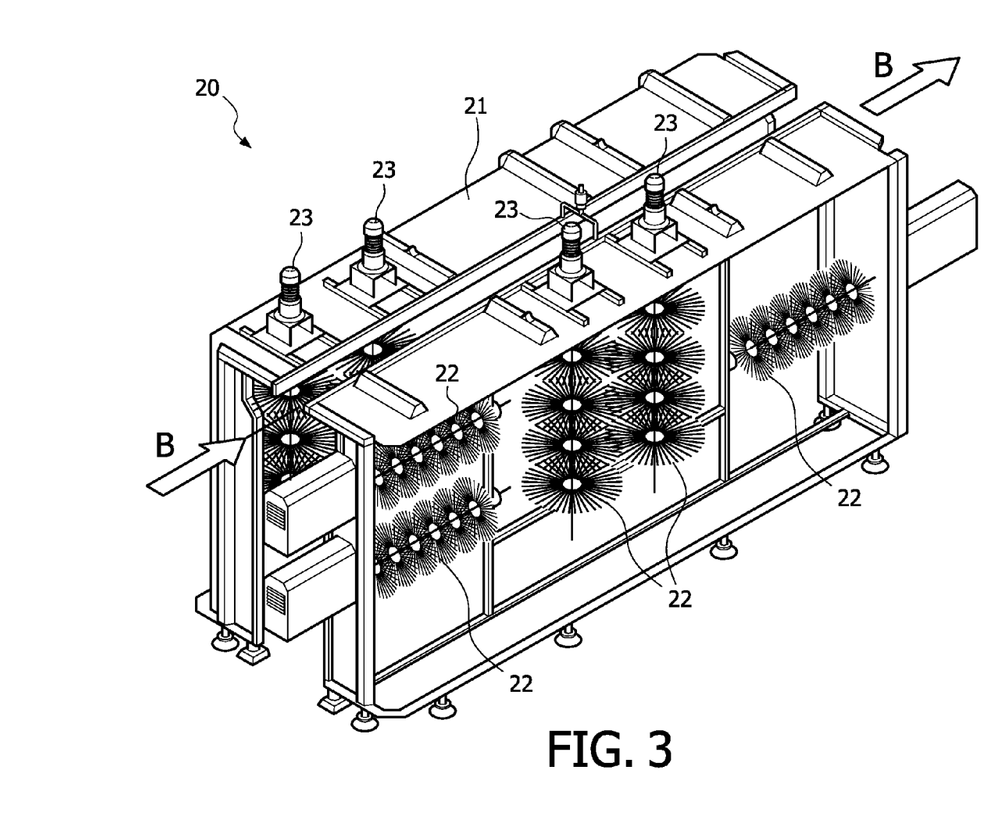
FIG. 3 shows one exemplary embodiment of a device comprising a plurality of co-acting brush elements.

FIG. 3 shows a device 20 comprising a plurality of co-acting brush elements mounted in rotatable brushes 22 according to the present disclosure as shown in FIG. 2A. Rotatable brushes 22 are oriented in both horizontal and vertical directions in two rows between which carcasses for processing, which are hanging from a transporting line (not shown), are moved in the direction of arrow B. The rotatable brushes are arranged in a frame 21 in the form of a housing, and are driven by drive shafts connected to external drive motors 23.

It will be apparent that the shown examples are non-limitative, and that many other embodiments and combinations can be envisaged by a skilled person in the field.

All patents, patent applications and publications referred to herein are incorporated by reference in their entirety.

The invention claimed is:

1. A detachable brush element for processing carcasses of slaughtered animals, comprising:
   a) at least one female coupling member; and
   b) at least one substantially elongated flexible whip extending from and integrated with the at least one female coupling member,
   wherein the whip has a profiled side adapted to process carcasses of slaughtered animals,
   wherein the female coupling member comprises a resilient cylinder comprising at least one female receiving space comprising, in cross-section, a ring having an opening with a narrowed entrance channel which can be enlarged counter to a bias, wherein the narrowed entrance channel widens into the female receiving space, the female receiving space being substantially larger than the narrowed entrance channel along the longitudinal axis of the whip, wherein the narrowed entrance channel is arranged in a lengthwise direction of the cylinder, the narrowed entrance channel is directed facing away from the profiled side of the whip, and the narrowed entrance channel narrows toward the female receiving space, wherein the female coupling member is adapted to couple with a generally cylindrical shaped male counter-coupling member, the ring opening being sized to accommodate a portion of the male counter-coupling member by snap-fitting the female coupling member opening over the male counter-coupling member, wherein the whip and the female coupling member are manufactured as a single material part, wherein the male counter-coupling member forms a part of a separate rotatable body onto which the female coupling member can be releasably coupled by a snap connection and, wherein the female coupling member can rotate about the male counter-coupling member.

2. The brush element of claim 1, wherein the brush element can rotate at least partially about the male coupling member when connected.

3. The brush element of claim 1, wherein a part of the receiving space connecting to the entrance is at least partially circular in cross-section.

4. The brush element of claim 1, wherein the receiving space has a pair of opposing contact sides and wherein a smallest distance of the narrowed entrance is a maximum of 80% of the greatest distance between opposite contact sides of the receiving space.

5. The brush element of claim 4, wherein the smallest distance of the narrowed entrance is a maximum of 50% of the greatest distance between opposite contact sides of the receiving space.

6. The brush element of claim 1, wherein the narrowed entrance is closed in non-loaded situation.

7. The brush element of claim 1, wherein the narrowed entrance is substantially tapering in the direction toward the receiving space.

8. The brush element of claim 1, wherein the whip has at least one profiled side adapted to process carcasses of slaughtered animals and wherein the entrance opening is directed substantially away from the profiled side.

9. The brush element of claim 1, wherein the female coupling member is manufactured substantially from a resilient plastic.

10. The brush element of claim 1, wherein the brush element comprises at least two substantially elongate flexible whips extending from the female coupling member.

11. The brush element of claim 2, wherein a part of the receiving space connecting to the entrance is at least partially circular in cross-section.

12. The brush element of claim 1, wherein the brush element can be removed from a rotatable body without disassembly of the rotatable body.

13. An assembly for processing carcasses of slaughtered animals, comprising:
a) a rotatable body;
b) at least one brush element having at least one female coupling member; and
c) at least one substantially elongated flexible whip extending from the female coupling member, wherein the whip has a profiled side adapted to process carcasses of slaughtered animals, wherein the female coupling member comprises a resilient cylinder comprising at least one female receiving space comprising, in cross-section, a ring having an opening with a narrowed entrance channel, and wherein the narrowed entrance channel can be enlarged counter to a bias, and wherein the narrowed entrance channel is arranged in a lengthwise direction of the cylinder and wherein the narrowed entrance channel is directed facing away from the profiled side of the whip and wherein the narrowed entrance channel narrows toward the ring opening;

wherein the narrowed entrance channel widens into the female receiving space, the female receiving space being substantially larger than the narrowed entrance channel along the longitudinal axis of the whip, wherein the female coupling member is releasably coupled to a male counter-coupling member forming part of the separate rotatable body such that the whip extends substantially radially from a rotation shaft of the rotatable body, the ring opening being sized to accommodate a portion of the male counter-coupling member by snap-fitting the female coupling member over the male counter-coupling member, and wherein the receiving space of the female coupling member engages round the male counter-coupling member.

14. The assembly of claim 13, wherein the male counter-coupling member has a circular cross-sectional diameter substantially the same as the diameter of the receiving space.

15. The assembly of claim 13, wherein the receiving space of the female coupling member has a larger diameter than the male counter-coupling member such that the receiving space has play at least in one rotation direction of the rotatable body.

16. The assembly of claim 13, wherein the male counter-coupling member is an engaging shaft located substantially parallel to the rotation shaft at a distance from the rotation shaft.

17. The assembly of claim 13, wherein the receiving space of the female coupling member has a larger diameter than the male counter-coupling member such that the receiving space has play at least in one rotation direction of the rotatable body.

18. A brushing device for processing carcasses of slaughtered animals, comprising:
a) a frame;
b) at least one assembly mounted in the frame, the assembly comprising
(i) a rotatable body,
(ii) at least one detachable brush element having at least one female coupling member, and
(iii) at least one substantially elongated flexible whip extending from the female coupling member wherein the whip has a profiled side adapted to process carcasses of slaughtered animals, wherein the female coupling member comprises a resilient cylinder comprising at least one receiving space comprising, in cross section, a ring having an opening with a narrowed entrance channel, and wherein the narrowed entrance channel can be enlarged counter to a bias and wherein the narrowed entrance channel is arranged in a lengthwise direction of the cylinder and wherein the narrowed entrance channel is directed facing away from the profiled side of the whip, and wherein the narrowed entrance channel narrows toward the ring opening, wherein the female coupling member is releasably coupled to a male counter-coupling member forming part of the rotatable body such that the whip extends substantially radially from a rotation shaft of the rotatable body, the ring opening being sized to accommodate a portion of the male counter-coupling member by snap-fitting the female coupling member over the male counter-coupling member, and wherein the receiving space of the female coupling member engages round the male counter-coupling member;

wherein the narrowed entrance channel widens into the receiving space, the receiving space being substantially larger than the narrowed entrance channel along the longitudinal axis of the whip, and c) drive means for causing rotation of the rotatable body of the assembly.

19. A detachable brush element for processing carcasses of slaughtered animals, comprising:
   a) at least one female coupling member; and
   b) at least one substantially elongated flexible whip extending from and integrated with the at least one female coupling member wherein the whip has a profiled side adapted to process carcasses of slaughtered animals,
   wherein the female coupling member comprises a resilient cylinder comprising at least one female receiving space comprising a ring having an opening with a narrowed entrance channel which can be enlarged counter to a bias and wherein the narrowed entrance channel is arranged in a lengthwise direction of the cylinder, wherein the narrowed entrance channel narrows toward the ring opening, and wherein the narrowed entrance channel is directed facing away from the profiled side of the whip, the female coupling member adapted to couple with a generally cylindrical shaped male counter-coupling member, the ring opening being sized to accommodate a portion of the male counter-coupling member,
   wherein the male counter-coupling member is forming a part of a separate rotatable body onto which the female coupling member can be releasably coupled,
   wherein the narrowed entrance channel widens into the receiving space, the receiving space being substantially larger than the narrowed entrance channel along the longitudinal axis of the whip, and
   wherein the whip and the coupling member are manufactured as a single material part.

20. An assembly for processing carcasses of slaughtered animals, comprising:
   a) a rotatable body including a plurality of rods associated with and spaced around at least one shaft;
   b) at least one brush element having at least one female coupling member; and
   c) at least one substantially elongated flexible whip extending from the female coupling member wherein the female coupling member comprises a ring having at least one female receiving space provided with a narrowed entrance, and wherein the narrowed entrance can be enlarged counter to a bias;
   wherein the narrowed entrance widens into the receiving space, the receiving space being substantially larger than the narrowed entrance along the longitudinal axis of the whip, and
   wherein the female coupling member is releasably coupled to one of the rods such that the whip extends substantially radially from the at least one shaft of the rotatable body and the brush element at least partially rotates around the rod and the shaft and wherein the narrowed entrance narrows toward the rod.

21. A detachable brush element for processing carcasses of slaughtered animals, comprising:
   a) at least one female coupling member comprising a resilient cylinder comprising an elongated narrowed entrance channel formed therein, providing the coupling with a C shape having a female receiving space and defining an axis of rotation, the C shape being adapted to enlarge counter to a bias, the channel being adapted to detachably couple by a snap connection through the C shape to a rod and adapted to rotate thereabout and wherein the narrowed entrance channel narrows toward the rod; and,
   b) at least one substantially elongated flexible whip member extending from and integrated with each female coupling member wherein the whip has a profiled side adapted to process carcasses of slaughtered animals, each whip member extending perpendicular to the axis of rotation of the channel, wherein the narrowed entrance channel is arranged in a lengthwise direction of the cylinder and wherein the narrowed entrance channel is directed facing away from the profiled side of the whip and wherein the narrowed entrance channel widens into the female receiving space, the female receiving space being substantially larger than the narrowed entrance channel of the at least one substantially elongated flexible whip along the longitudinal axis of the whip.

22. The detachable brush element of claim 21, wherein the female coupling member is adapted to couple to the rod by movement of the female coupling member in a direction perpendicular to the axis of the rod.

* * * * *

(12) INTER PARTES REVIEW CERTIFICATE (2161st)
United States Patent (10) Number: US 9,433,225 K1
Servaas (45) Certificate Issued: Jun. 25, 2021

(54) BRUSH ELEMENT, ASSEMBLY, BRUSHING DEVICE AND METHODS OF COUPLING AND UNCOUPLING

(75) Inventor: Hans Servaas

(73) Assignee: HUMBOLDT B.V.

Trial Number:

IPR2019-00346 filed Nov. 19, 2018

Inter Partes Review Certificate for:

Patent No.: 9,433,225
Issued: Sep. 6, 2016
Appl. No.: 12/094,984
Filed: Sep. 30, 2008

The results of IPR2019-00346 are reflected in this inter partes review certificate under 35 U.S.C. 318(b).

INTER PARTES REVIEW CERTIFICATE
U.S. Patent 9,433,225 K1
Trial No. IPR2019-00346
Certificate Issued Jun. 25, 2021

AS A RESULT OF THE INTER PARTES REVIEW PROCEEDING, IT HAS BEEN DETERMINED THAT:

Claims 1-5 and 7-22 are found patentable.

\* \* \* \* \*